United States Patent
Tracy et al.

(10) Patent No.: US 9,454,707 B1
(45) Date of Patent: Sep. 27, 2016

(54) SYSTEM AND METHOD FOR READING A TIRE CODE AND OBTAINING TIRE-RELATED INFORMATION

(71) Applicants: Roger Tracy, Chicago, IL (US); Cesare Santanera, Turin (IT)

(72) Inventors: Roger Tracy, Chicago, IL (US); Cesare Santanera, Turin (IT)

( * ) Notice: Subject to any disclaimer, the term of this patent is extended or adjusted under 35 U.S.C. 154(b) by 0 days.

(21) Appl. No.: 14/926,742

(22) Filed: Oct. 29, 2015

(51) Int. Cl.
| | |
|---|---|
| *G06K 9/00* | (2006.01) |
| *G06K 9/22* | (2006.01) |
| *G06K 7/10* | (2006.01) |
| *H04N 1/00* | (2006.01) |
| *G06K 9/24* | (2006.01) |

(52) U.S. Cl.
CPC ............. *G06K 9/228* (2013.01); *G06K 7/1092* (2013.01); *G06K 9/24* (2013.01); *H04N 1/00244* (2013.01); *G06K 2007/10524* (2013.01)

(58) Field of Classification Search
CPC .......... G06K 9/228; G06K 9/22; G06K 9/24; G06K 7/1092; G06K 2007/10524; H04N 1/00244; H04N 1/00241
USPC ........................................................ 382/313
See application file for complete search history.

(56) References Cited

U.S. PATENT DOCUMENTS

| | | | |
|---|---|---|---|
| 4,625,101 A | 11/1986 | Hinks et al. | |
| 6,000,612 A * | 12/1999 | Xu | ................. 235/454 |
| 7,153,381 B2 | 12/2006 | Majumdar et al. | |
| 2006/0113374 A1* | 6/2006 | Taylor et al. | ................. 235/376 |
| 2012/0169856 A1* | 7/2012 | Ahmed | ........................... 348/61 |

FOREIGN PATENT DOCUMENTS

| | | |
|---|---|---|
| CA | 1238414 | 6/1988 |
| CN | 102750615 A | 10/2012 |
| EP | 1073031 A1 | 1/2001 |
| GB | 2317496 A | 3/1998 |
| KR | 1020010001027 A | 1/2001 |
| WO | WO 2005/000714 A1 | 1/2005 |

* cited by examiner

*Primary Examiner* — Yon Couso
(74) *Attorney, Agent, or Firm* — Michael A. Mann; Nexsen Pruet, LLC

(57) ABSTRACT

A tire code reader scans an automobile tire to capture an image of the tire code molded on the tire sidewall and associates it with the vehicle identification number (VIN) read by a bar code scanner also on the reader. Both tire code and VIN are uploaded to a control server and then to a cloud-based server that is programmed with optical character recognition software for reading the tire code and for accessing databases for information about that tire, such as re-call information, and the make, model and year of the automobile. The cloud-based server transmits a report back to the control server for printing a full report by a printer and to the tire code reader for display of the tire code.

19 Claims, 14 Drawing Sheets

SYSTEM AND METHOD FOR READING A TIRE CODE AND OBTAINING TIRE-RELATED INFORMATION

BACKGROUND

The tires of an automobile are an important component. Tires engage the road and ideally maintain good contact under a variety of weather and road conditions. Tires include road surface-engaging treads and supporting sidewalls. The sidewall of each tire carries information about the tire such as the brand of tire and a Department of Transportation code, or simply, a tire code. The tire code identifies the name of the manufacturer that made the tire, where it was made, and when it was made so that a defect in a particular tire can be traced through its tire code to determine whether other tires manufactured by that manufacturer might also contain the defect. The code also helps to identify other tires that could be used as replacements.

The specification for the tire code and its contents is provided in Title 49 of the Code of Federal Regulations Section 571.109 and is an alphanumeric code. The tire code comprises the letters DOT followed by twelve alpha-numeric characters formed in relief in the sidewall of the tire, either by molded raised or molded inset characters. Tires are usually black so the code is "black on black" and difficult to read particularly in low light. An illustration of a tire code is shown in FIG. 1.

SUMMARY

The tire code reader disclosed herein is a laser-sensing device for use by a tire technician to scan a tire sidewall in order to capture an image the tire code and upload that image via Wi-Fi to a cloud-based server. The server is programmed with optical character recognition (OCR) software for reading the code from the received image and transmitting the code to the technician using the tire code reader. The reader has a user interface that includes a touch screen over a liquid crystal display (LCD), a trigger to activate the scanner, and a power on/off button.

In use, the tire code reader is positioned facing the tire code on the tire using the reader's shroud to establish a fixed distance between the reader and the side wall of the tire, and then the laser sensor scans the tire code to capture a two-dimensional image of the tire code based on small variations in the distance to the tire side wall surface. The tire code reader also contains a bar code scanner to read the vehicle's vehicle identification number (VIN) from the inside of the vehicle's door. The VIN number and the tire code are transmitted together to the cloud-based server for decoding the tire code and obtaining information about the vehicle. Then the tire code, VIN and the information about the tire and the vehicle are sent wirelessly to a control server and to the tire code reader.

The control server generates and sends a report to a printer at a tire service company, and to the tire code reader itself so key results from the report can be displayed by the tire code reader to a technician.

The tire code reader may be used, to acquire an image of the tire code (1) on a tire that is mounted on a rim on a vehicle, such as a tire on customer's vehicle in a service bay; (2) on a tire mounted on a rim but not on a vehicle, such as on a spare tire; and (3) on a tire not mounted on a rim, such as on tire in store inventory.

The tire code reader may also acquire a set of images of the tire codes for all the tires associated with a particular vehicle or with a particular customer so that all images in the set can be transmitted to the server for processing as a group. For example, it could transmit a set of images that includes tire codes for all four tires on a vehicle plus the code for a spare tire.

A feature of the present tire code reader is that it captures a tire code image in less than 5 seconds.

Another feature of the present tire code reader is that it has a power-off state that minimizes power draw from the battery which it can enter after a period of inactivity while remaining in operational mode. The low-power state consumes less power than when the reader is operating. For example, in low-power mode, the display may not be backlighted, thus saving the electric energy require for the LEDs that backlight the display.

A related feature of the present tire reader is that it indicates the level of battery power level remaining as a percent (0-100%) of battery capacity.

Yet another feature of the present tire code reader is that operates wirelessly, establishing a Wi-Fi connection to the control server and the cloud-based server, as well as a printer and the tire code reader.

Still another feature of the tire code reader is that the reader itself has a unique identification number that is transmitted to the control server together with images of the tire codes and bar codes, so that several readers may be operating at the same time and from different locations, and the same cloud-based server can direct the analysis of the tire codes being read to the right location and right tire code reader.

A feature of the tire code reader is that it enables the entering of an alternative identification strings for a set of tire data when the VIN is not available, such as when a single tire not on a vehicle is presented. Additionally, the tire code reader supports tire code images for each tire in a set of up to seven tires, and that the images for the set of tires are stored in the reader while the reader is powered on, at least until that reader begins collecting images from another set of tires.

Other features and their advantages will be apparent to those skilled in the art of tire maintenance from a careful reading of the Detailed Description accompanied by the following drawings.

BRIEF DESCRIPTION OF THE DRAWINGS

In the figures.

DETAILED DESCRIPTION

Acronyms are used in this disclosure for convenience. Here is a table of acronyms used herein and their corresponding meanings.
  a. ABS—Acrylonitrile Butadiene Styrene, a type of plastic resin;
  b. ADC—Analog-to-Digital Converter;
  c. CDC—Communications Device Class, namely a composite USB class that includes more than one interface (custom control, data, audio, mass storage)
  d. CRC—cyclic redundancy check
  e. DC—Direct Current;
  f. DOT—the United States Department of Transportation;
  g. EMI—Electro-Magnetic Interference;
  h. eMMC—embedded multimedia card;
  i. ESD—Electro-Static Discharge;
  j. FAT—File Allocation Table;
  k. GHz—gigahertz;
  l. GPIO—general purpose input/output;
  m. IEEE—Institute of Electrical and Electronics Engineers;
  n. IR—Infra-Red;
  o. ISM—Industrial, Scientific and Medical band of the radio frequency portion of the electromagnetic spectrum;
  p. LCD—Liquid Crystal Display;
  q. LED—Light-Emitting Diode;
  r. OCR—Optical Character Recognition;
  s. PC—Poly-Carbonate plastic;
  t. PCB—Printed Circuit Board, an assembly that includes electronic components;
  u. PCAP—Projected Capacitive, a type of touch screen technology that allows multiple touches and gestures to be recognized;
  v. Qt Framework—a library of common programming objects, such as threads, lists, and sockets
  w. RGB—Red-Green-Blue, an additive color type of color monitor;
  x. RPM—revolutions per minute;
  y. SDIO—Secure Digital Input/Output;
  z. TFT—Thin Film Transistor;
  aa. TIN—Tire identification number
  bb. TS—Touch Screen;
  cc. USB—universal serial bus;
  dd. WEP—Wired Equivalent Privacy, a security protocol;
  ee. Wi-Fi—a registered trademark for computer hardware and peripherals for wireless networking products, owned by the Wireless Ethernet Compatibility Alliance, Inc.; and
  ff. WPA—Wi-Fi Protected Access, a security protocol.

Figure 1:
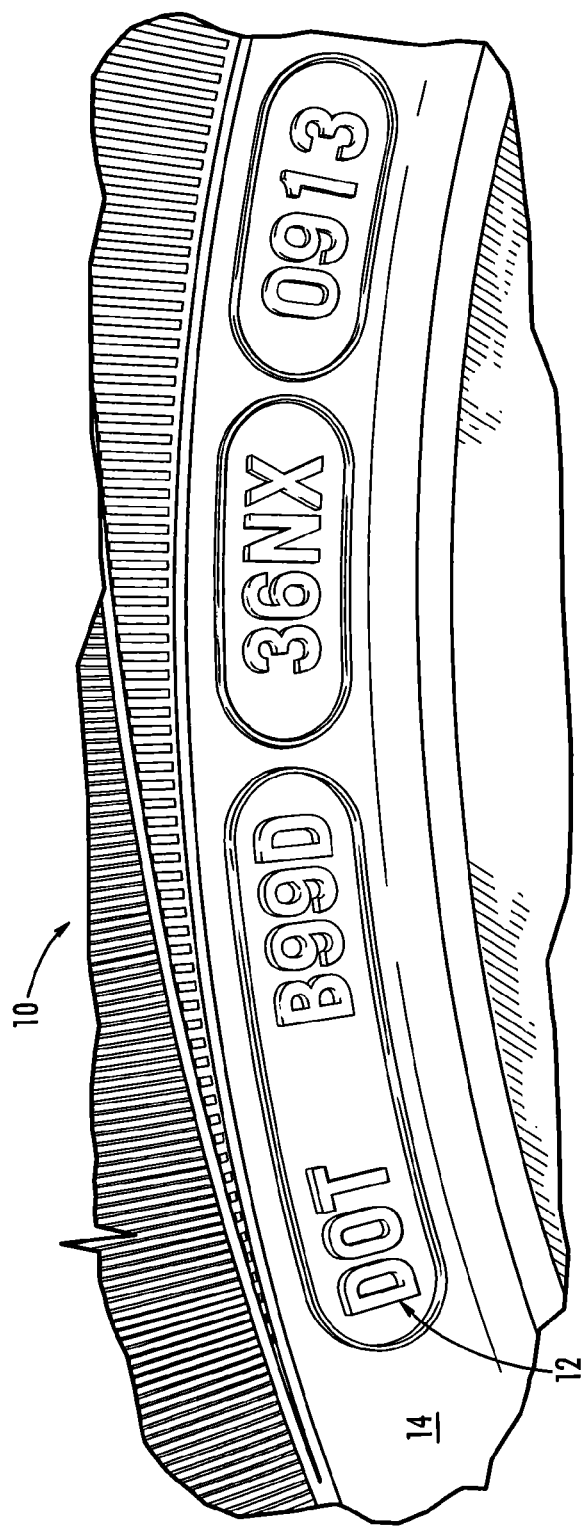
FIG. 1 is a drawing of a portion of a tire sidewall showing a representative tire code.

This disclosure describes a device and system for obtaining tire-related information quickly, accurately, and efficiently. This information is obtained from a DOT tire code and from a bar code of a vehicle identification number (VIN). The bar coded is carried on a sticker on the door frame of the vehicle. The DOT tire code is molded in the sidewall of tires. FIG. 1 illustrates a tire 10 carrying a representative tire code 12 on the side wall 14 of the 10.

Figure 2:
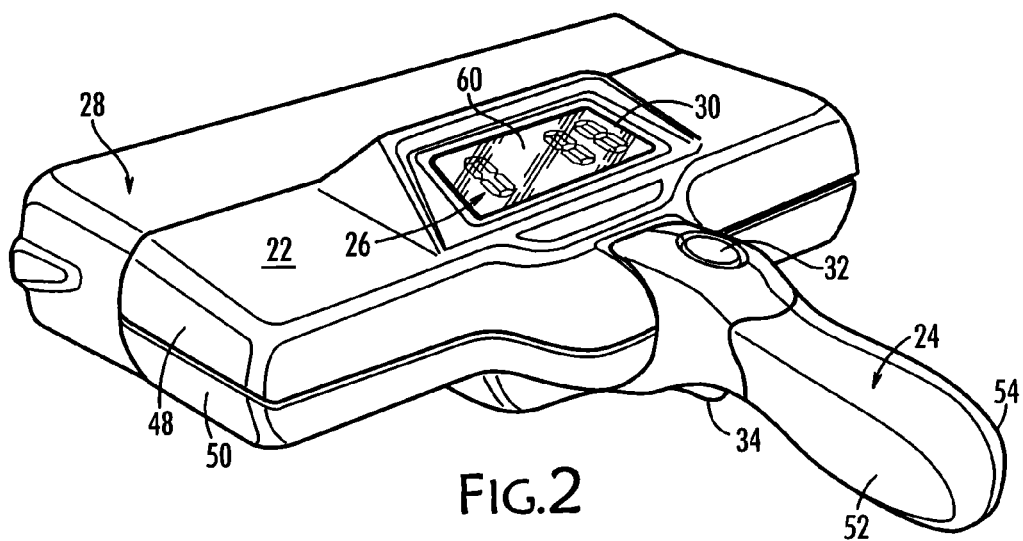
FIG. 2 is a perspective view of a tire code reader according to an aspect of the disclosure.

Tire code reader 20 is a hand-held device used by tire service personnel to read tire code 12 on the vehicle tire 10 and the VIN bar code. Tire code reader 20 may also read barcodes attached to tires for other purposes, including pricing and inventory control of new tires and winter storage tires. Tire code reader 20, as seen in FIG. 2, obtains obtaining the two-dimensional image of the tire code 12 on the sidewall 14 of each tire 10 on the vehicle in sequence. Reader 20 also reads the bar code of the vehicle identification number (VIN) on the vehicle, which is typically on a sticker on the frame for the driver's side door. If a tire 10 is presented that is not on a vehicle, only tire code 12 is scanned. Tire code 12 identifies the manufacturer of the tires, the facility where the tires were made, the lot number, and date of manufacture. The VIN can be used to determine the vehicle make, model, and date of manufacture and the tires recommended for that vehicle. Together the tire code and VIN lead to tire-related information that can be used to confirm that the tires are appropriate for the vehicle they are on and whether there have been re-calls of the same type of tire.

Figure 17:
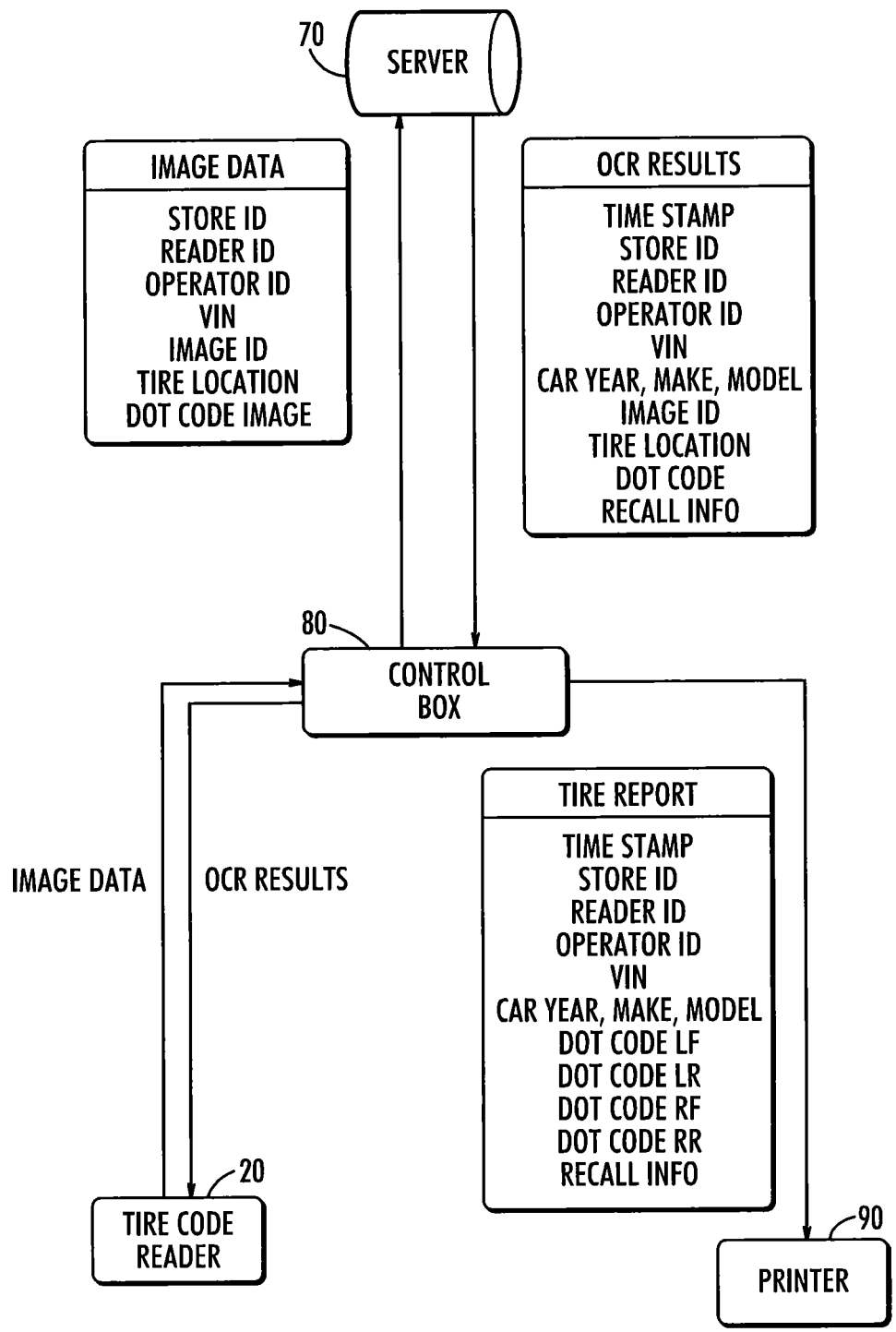
FIG. 17 is a Wi-Fi protocol data flow diagram, according to an aspect of the disclosure.

The present system comprises tire code reader 20, a control server 80 and a cloud-based server 70, as well as a printer 90. FIG. 17 illustrates this system. A cloud-based server 70 is programmed to recognize the alphanumeric characters of tire code 12 in the image obtained by tire code reader 20 for each tire 10 scanned and to access and interrogate remote databases, such as the database of the National Highway Traffic Safety Administration (NHTSA), for information regarding the VIN of the vehicle, the appropriate tires for that vehicle, and recall information. A control server 80 is connected to cloud-based server 70 and to a printer 90 to print out a tire report based on its analysis by cloud-based server 70 and to return key information to tire code reader 20 for display to the technician. Communication among tire code reader 20, control server 80, and cloud based server 70 takes place wirelessly.

As seen in FIG. 2, tire code reader 20 includes a housing 22, a two-position, pivoting handle 24, a display 26, and a shroud 28. Reader 20 also includes and an ON/OFF button 32 for activating and deactivating code reader 20 and a trigger 34 to activate a tire code scanner 36.

Figure 3:
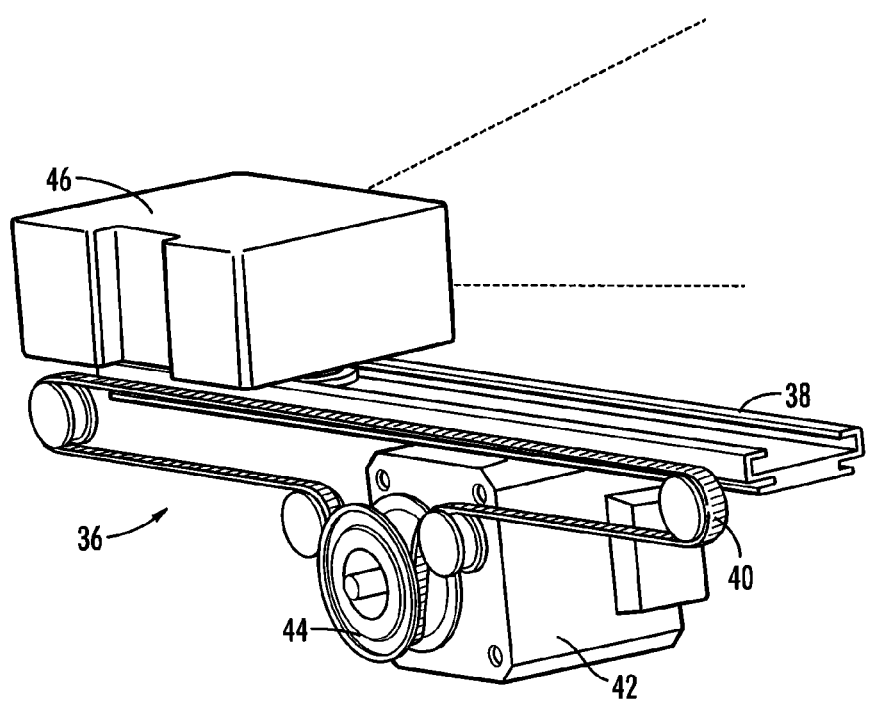
FIG. 3 is a perspective view of a tire code scanner, according to an aspect of the disclosure.

Shroud 28 covers the laser light path from tire code scanner 36 to tire 10 (see also FIG. 3). Tire code scanner 36 may have a limit of 25K lux of ambient light, which is approximately shade during a blue sky day at noon.

A general two-dimensional tire code scanner 36 is a requirement, such as that sold by Zebra under the model number SE-3307SR-L000R. In addition, two laser pointers are attached to the end of shroud 28 to provide a method to locate the tire code for scanning. The laser pointers are approximately 6.5 mm by 17 mm long.

Tire code scanner 36 may be of the type manufactured by Baumer in Switzerland. Tire code scanner 36 measures distance to tire 10 along a transverse line in 0.2 mm increments. Scanner 36 moves in two directions, including 0.2 mm increments in a direction orthogonal to the motion of scanner 36 in scanning tire code 12. Tire code 12 is approximately 30 mm×120 mm.

A sunlight readable display 26 is needed for reading tire code 12. LCD 60 in display 26 may be 4.3 inches on the diagonal such as that manufactured by Ortustech under the model number COM43H4M10XTC and has a landscape LCD/TS assembly.

FIG. 3 shows tire code scanner 36 that includes a laser 46 which traverses a low-friction guide rail 38 during which it scans the two-dimensional image of tire wall 14. Scanner 36 is pulled over rail 38 by a timing belt 40 driven by a gear drive 44 rotated by a motor 42. When gear drive 44 rotates, timing belt 40 moves, and scanner 36 moves. Motor 42 may be either a stepper or a DC motor.

Motor 42, among other requirements is battery powered, and must accurately position scanner 36. Several motor types are satisfactory, including brushed motors, brushless motors, and stepper motors. Motor 42 may operate at approximately 150 RPM, +/−50 RPM, slow for DC Brushed and Brushless motors, so gear reduction is needed for those motor types.

The current drawn by a brushed DC motor will increase when it stops at the end of travel. That current increase is used to cause motor 42 to reverse direction. Alternatively, other methods for moving scanner 36 could be used, including a ball-screw/lead screw, a rotational movement mechanism, or a rack and pinion gear system, or a cable and spool system. The length of reader 20 is about 25 cm (9.5 inches) in order to provide about 15 cm (6 inches) of travel to read tire code 12, and the laser length is about 7.5 cm (3 inches). The tire scan time is approximately 2 seconds.

The speed and direction of motor 42 is controlled using pulse width modulation and general purpose input/output signals. The position of motor 42 is tracked by counting the pulses produced by either an encoder (if a DC motor) or by the processor (if a stepper motor). These pulses are counted using a hardware timer module. When a certain number of pulses has been counted, the scan of the laser has been completed.

Referring again to FIG. 2, housing 22 has an upper part 48 and a lower part 50 and handle 24 also has two parts, a left part 52 and a right part 54. Handle 24 carries a battery 82 (not shown in FIG. 2) in an interior compartment. Handle 24 pivots from the position as shown in FIG. 2 to a position about 75 degrees clockwise from that shown so that reader 20 can be conveniently aimed at tire code 12. Shroud 28 of reader 20 is placed against sidewall 14 of a tire 10 so that it surrounds tire code 12. Shroud 28 provides a fixed distance standoff from tire sidewall 14 to the scanner for consistent measurement of the distance from scanner 44 to sidewall 14. The distance to tire will vary slightly because of the inset or raised molded characters of tire code 12.

A transparent Nylon lens (not shown) is positioned over the opening of scanner 36 to protect it from moisture and dust. This lens is sealed between upper and lower housings with a rubber seal. A frame (not shown) carries all the parts of the scanner and is made from 6061 aluminum or glass-filled polycarbonate for stiffness.

Figure 4:
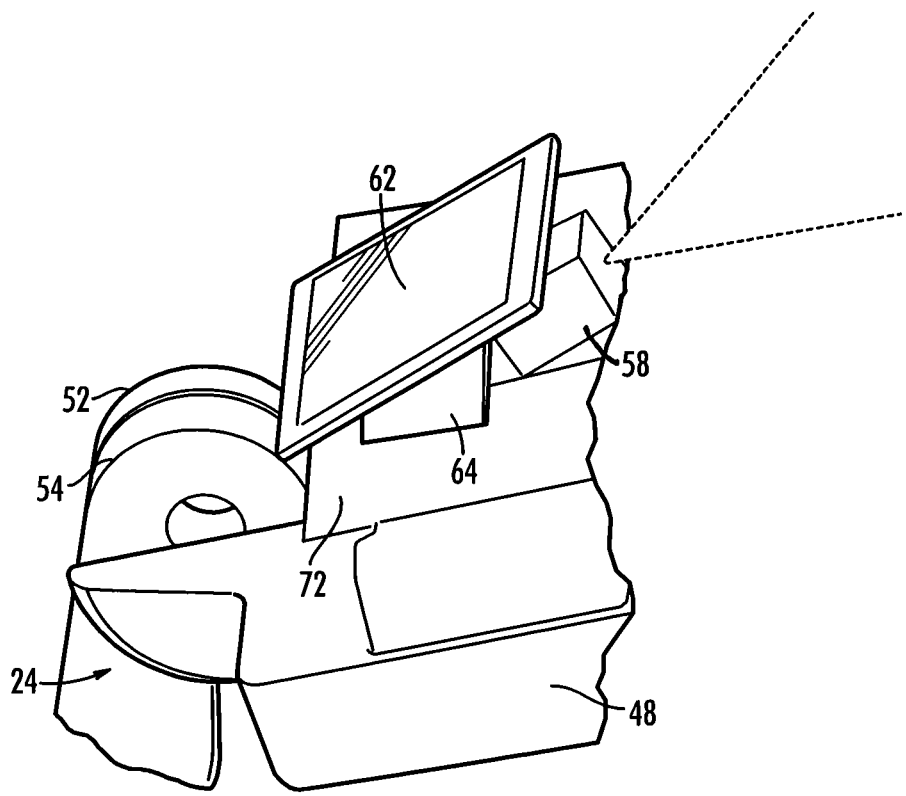
FIG. 4 is a perspective view of a bar code scanner and main printed circuit board according to an aspect of the disclosure.

Upper part 48 of housing 22 is configured to carry the liquid crystal display (LCD) 60 and touch screen (TS) 62, as seen in FIG. 4. A mounting frame 30 secures the LCD/TS to upper part 48 and screw bosses help to hold upper and lower parts 48, 50, of housing 22 together. Because the mounting frame needs to be stiff, it may be molded using glass-filled ABS, for example. LCD 60 and TS 62 are internal parts, so automotive fluids are much less likely to come in contact with it and there is more flexibility in choosing materials for it and its frame.

The main PCB 64, as also seen in FIG. 4, will also be mounted within upper part 48 of housing 22. ON/OFF button 32 (see FIG. 2), made of rubber, seals against upper part 48 and makes contact with main PCB 64.

Lower part 50 of housing 22 may also be made of high-impact Nylon, and interlocks with, seals to, and fastens to upper part 48. Lower part 50 encloses laser scanner 36, best seen in FIG. 3, and seals to the frame of the upper part 48 of housing 22.

Left and right parts 52, 54 of handle 24 are trapped between the upper and lower parts 48, 50 of housing 22. Trigger 34 is also trapped between left and right parts 52, 54 of handle 24. Left part 52 may have bosses in it for screws to hold it to right part 54. It may also have a rubber seal in its wall to seal left and right parts 52, 54. Handle 24 houses a battery 82 and may be made of high impact Nylon. Battery 82 for tire code scanner 36 may comprise a package of two 18650 lithium ion cells and protection circuitry. Battery 82 plugs into main PCB 64. Cables (not shown) are required to connect main PCB 64 to tire code scanner 36, to bar code scanner 58, to motor 42, to trigger 34, and to laser 46.

Upper and lower parts 48, 50, of housing 22 carry detents to lock handle 24 in either of its two positions: 75 degrees and 0 degrees with respect to housing 22.

Tire code reader 20 needs to be rugged and impact-resistant for an industrial environment. Accordingly, it may be made of Nylon, such as DuPont Zytel® ST801, a modified Nylon 66, able to withstand extremely high, repeated impact based on the results of the well-known Izod impact strength test.

Gasoline, oil, antifreeze, grease and dirt will likely come in contact with tire code reader 20. Housing 22 and touch screen 62 need to withstand those chemicals and also cleaning chemicals. Accordingly, tire code reader 20 may be made of Nylon (polyamide) 66, which is versatile, easily-molded and resistant to high temperatures and harsh chemicals. The touch screen 62 and the window of scanner 40 can be molded out of transparent Nylon, such as that sold under the trademark EMS-Grivory® TR55 transparent Nylon.

Figure 5:
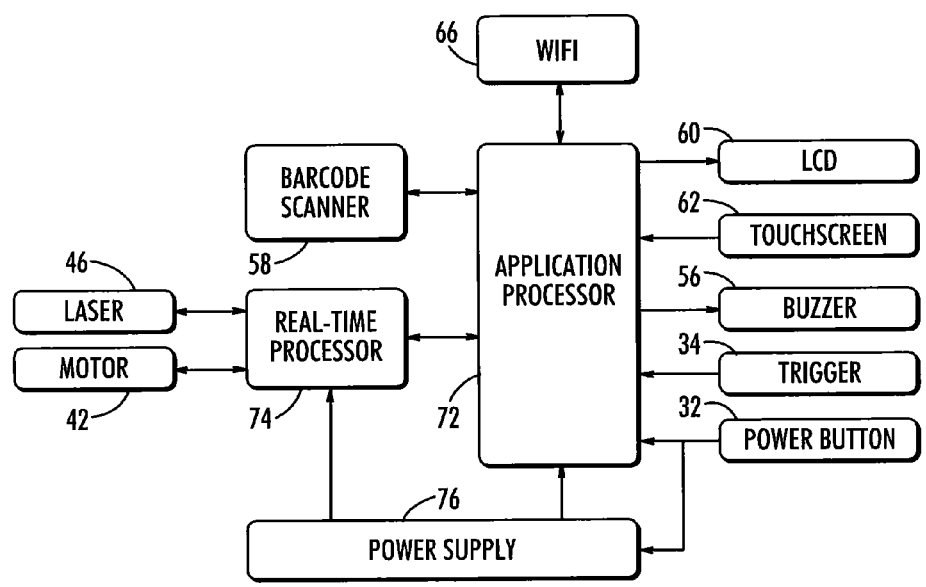
FIG. 5 is a block diagram of the system for obtaining and processing tire-related information, according to an aspect of the disclosure.

Referring now to FIG. 5, the tire code reader 20 has a dual processor design. An application processor 72 runs an operating system and is responsible for controlling the user interface (LCD 60, touchscreen 62, a buzzer 56, trigger 34, and power button 32), barcode scanner 58, and Wi-Fi communications 66 to the control server 80. The second processor is a real-time processor 74 that is responsible for controlling laser 46 and motor 42 used move laser 46. Both processors 72, 74, receive power from the same power supply 76, which includes battery 82 in handle 24.

This architecture supports the user interface screens and communication via Wi-Fi with control server 80 and cloud server 70. In a dual processor design, application processor 72 continues to respond to touch screen 62 events and to communicate via wirelessly even during the scanning of a tire code 12 is being performed.

The tire code reader 20 is capable of scanning a bar code containing the vehicle identification number or, alternatively, allowing it to be manually entered via TS 62, and scanning tire code 12 on tire sidewall 14, then connecting via Wi-Fi communications 66 to servers 70 and 80, and then switching automatically to a low power "sleep mode" or receiving firmware upgrades all wirelessly.

Figure 6:
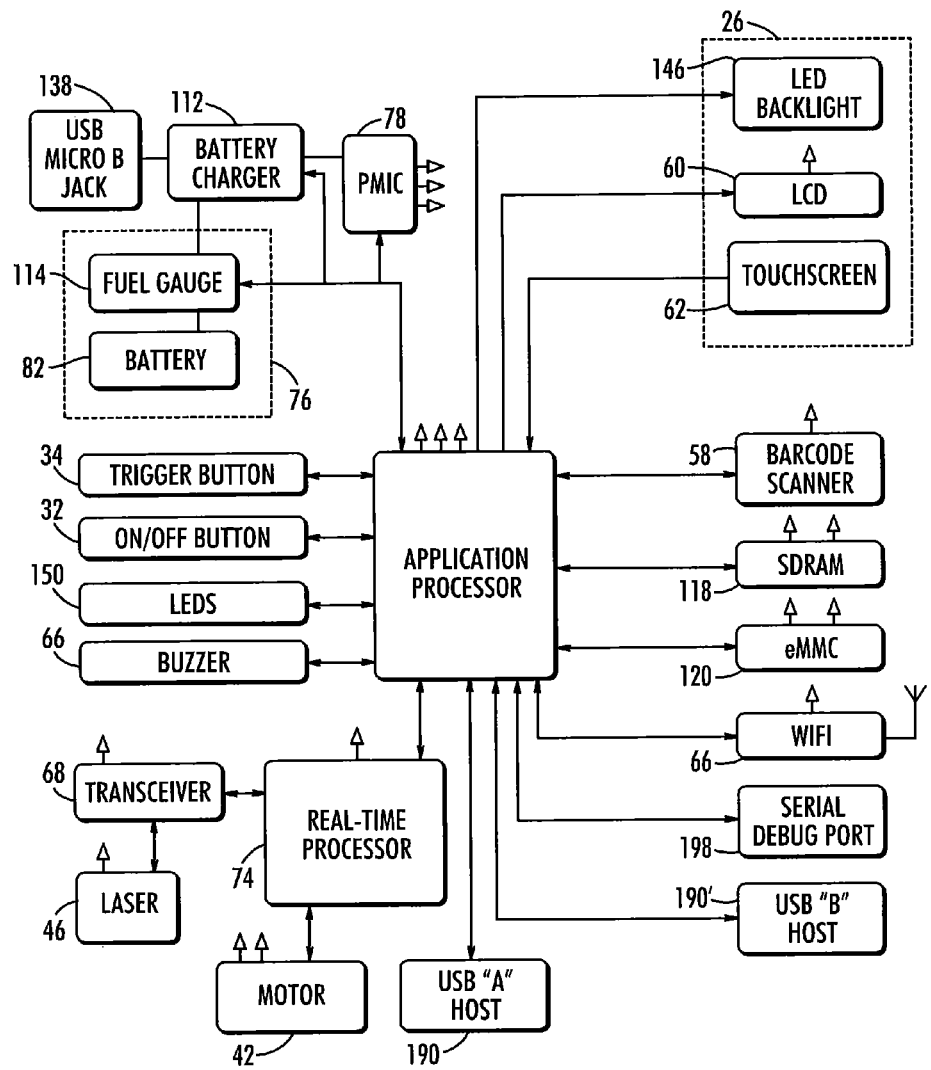
FIG. 6 is a block diagram of components of the tire code reader for obtaining and processing tire-related information, according to an aspect of the disclosure.

Referring to FIG. 6, which is a hardware block diagram, the system's primary application processor 72 may be an Atmel SAMA5D31, based on an ARM® Cortex™-A5 processor operating at up to 536 MHz (850 DMIPS). Application processor 72 is a floating-point unit, capable of supporting an operating system, and having a comprehensive peripheral set for connectivity and advanced user interfaces, including support for 10/100 Ethernet, high-speed USB, and a graphical color LCD 60.

Application processor 72 may be located above bar code scanner 58 and below the LCD 60, as shown in FIG. 4. This location provides the best location for interconnections among LCD 60, motor 42, bar code scanner 58 and laser 46.

The hardware architecture of tire code reader 20 is built around application processor 72, which controls the user interface (LCD 60, ON/OFF button 32, and trigger 34) and, based on inputs from the user, activates the various peripheral functions (barcode scanner 76, Wi-Fi 66, laser 46, and buzzer 56). Power for the system will be from a rechargeable lithium ion battery 82. Power supply 76 for application processor 72 is created by a power management integrated circuit (PMIC) 78 with a DC-DC converter. Real-time processor 74 has real-time control of motor 42 and the data interface to laser 46. The interface of laser 46 to the application processor 72 is via USB.

LCD 60 may be a wide screen format that is viewable in direct sunlight. Display 26 includes a 4-wire resistive TS 62 that directly connects to application processor 72.

Tire code reader 20 has four (4) external interfaces, including a MicroB USB jack 138 for the DC wall supply to connect and charge power supply 76, ON/OFF button 32 to turn tire code reader 20 on and off, trigger 34 for activating barcode scanner 58 and tire code scanner 36. Mode selection is obtained via TS 62. Buzzer 66 provides audible feedback to the user.

Barcode scanner 58 interfaces directly with application processor 72 via a universal asynchronous receiver/transmitter (UART).

Application processor 72 performs three main functions, namely, the board level test application, the compliance test application, and tire code scanning.

The board level test function verifies the electrical board design. This function monitors all external hardware and verifies hardware functionality. It allows a technician to select from a menu of tests, via a user interface, and optionally present the results of the tests selected. This function is not designed to be used by the end user but rather by a technician servicing tire code reader 20.

The compliance test function is used during radio frequency testing for unintentional radiations. This function is similar to tire code scanning, but frequently activates laser 46 and motor 42 without pressing trigger 34. Laser 46 and motor 42 are likely sources of electromagnetic noise, so these two components require periodic testing.

The tire code scanning function is performed by application processor 72, which also manages the user interface, connects to and communicates with control server 80, communicates with real-time processor 74, barcode scanner 58, tire code scanner 36, and display 26.

Real-time processor 74 may be similar to that manufactured by Atmel, model SAMD21, which is based on the ARM Cortex-M0+ and operates at a processor speed of up to 48 MHz. This processor has 256 KB of Flash and 32 KB of RAM. It features a 12-channel DMA, five 16-bit timers, three 24-bit timers, and six serial communication interface modules. Real-time processor 74 communicates with motor 42 to control laser 46. Real-time processor 74 is also capable of entering a very low power state, as is appropriate when a scan is not being performed, to increase battery life. Real-time processor 74 also communicates with application processor 72.

To satisfy the image and scan performance requirements, these subsystems require strict real-time control. A dedicated real-time processor 74 is a resource that satisfies both functional and performance requirements. The use of two processors, namely application processor 72 and real-time processor 74, is a feature of the present disclosure.

The tire code reader 20 is designed and programmed to be multi-threaded in order to promote processing parallelism. This feature allows display 26, laser 46 operation, and Wi-Fi communications 66 to be responsive and efficient in achieving their respective functional and performance requirements at the same time.

Inter-processor communication architecture between application processor 72 and real-time processor 74 uses binary serial protocol, which takes advantage of a well-developed and tested software base.

Application processor 72 sends command messages to real-time processor 74. Commands include those for configuring laser 46, requesting laser 46 status, initiating a scan of tire code 12, resetting laser 46, and initiating a firmware upgrade of real-time processor 74.

Real-time processor 74 sends laser data to application processor 72 during a scan of tire code 12. Each data set contains distance data for one vertical raster of tire code 12.

Application processor 72 queries real-time processor 74 for status of laser 46 and for the firmware version.

FIGS. 7-14 describe various parts of the design of tire code reader application 100 that flow from Qt framework 102. Tire code reader application 100 is the central software in the system. It is responsible for managing the user interface 136, Wi-Fi module 126 to control server 80, and the interaction with laser 46. Tire code reader application 100 allows the user to interact with user interface 136, connect to control server 80, scan a vehicle VIN, scan a tire code 12, send data to the control server 80, and display tire re-call status.

Figure 7:
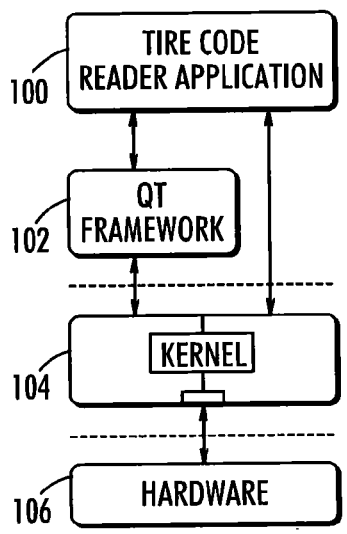
FIG. 7 is a block diagram of the tire code reader application from an overall perspective, according to an aspect of the disclosure.

There is firmware for both application processor 72 and real-time processor 74. The software, as seen in FIG. 7 has three layers.

In the top layer, in the "user space," is tire code reader application 100, and a Qt framework 102. Qt Framework 102 is a library of common programming objects, such as threads, lists, and sockets that reduces implementation time and abstracts kernel 104, in the next layer, for applications. Below that is the hardware 106. Kernel 104 initializes all of the peripheral hardware 106, handles memory management, performs process scheduling, and mounts the other file systems for running applications. Kernel 104 is responsible for providing a common interface to many peripherals and managing power usage. Kernel 104 also initiates the process of scanning. Kernel 104 contains the supporting hardware 106 for performing its various tasks including the electrical circuitry needed to support the features of tire code reader 20.

On activation of the system, the first step is system set-up followed by the launch of the interface for the user. Control Server 80 enables interaction by the user with the system as a whole. Kernel 104 provides many of the drivers for the external components in the system and manages memory allocation and power management. In short, kernel 104 provides a common interface for accessing the various system components.

Figure 8:
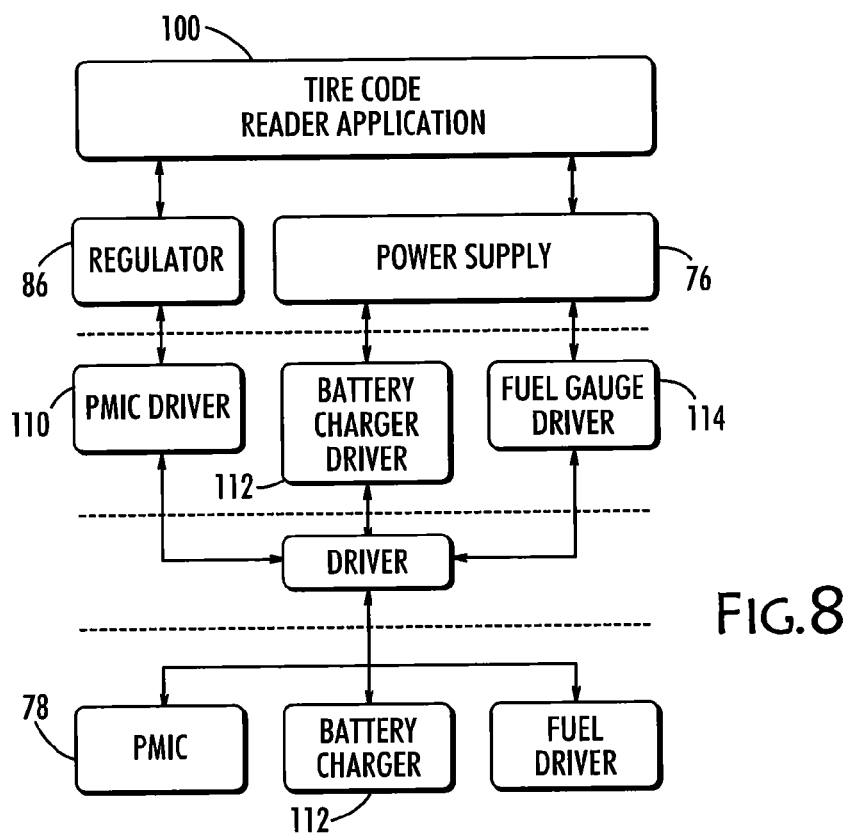
FIG. 8 is a power block diagram for the tire code reader application showing the power supply, according to an aspect of the disclosure.

FIG. 8 shows a block diagram of power supply 76. Power supply 76 is designed to manage the power requirements of tire code reader 20. Application processor 72 controls power supply 76 and a power regulator 86, and monitors the status of battery 82 to ensure that battery life meets system requirements.

The power management integrated circuit (PMIC) 78 sequences power supply 76 and configures the voltage level for application processor 72 to reduce power. If PMIC driver 110 detects low battery voltage, it interrupts application processor 72 to allow safe shutdown.

Battery charger driver 112 manages battery charging and allows the system to continue operation during recharge.

The fuel gauge driver 114 measures the remaining capacity in the battery. The remaining capacity is displayed to the user and monitored by application processor 72, so that tire code reader 10 can be shutdown safely when battery 82 runs low.

Figure 9:
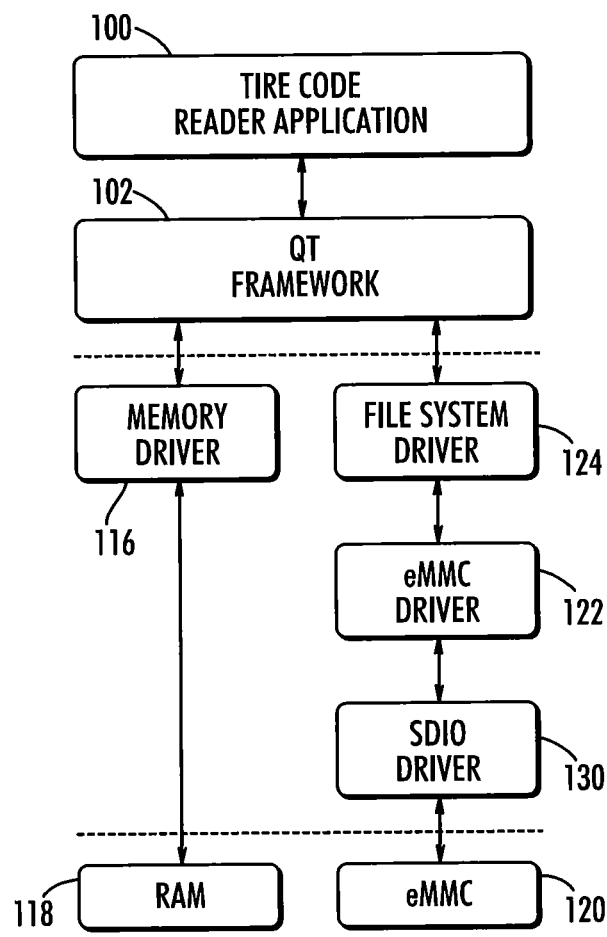
FIG. 9 is a memory block diagram for the tire code reader application, according to an aspect of the disclosure.

As seen in FIG. 9, tire code reader 10 has two memory types that support the product features: random access memory (RAM) 118 for application execution and temporary storage of data, and eMMC memory 120 to support non-volatile storage for applications and application data.

RAM 118 may be similar to that manufactured by Micron, such as model number MT42L128M32D1 and have a capacity of 512 MB in order to support running the operating system and tire code reader application 100.

One of the main memory storage requirements is storing seven tire code scans. Each scan has a size of about 600 KB of raw data received from laser 46, representing a rectangular array of measurement points that is 750 points long by 200 points wide per tire code, at 4 bytes per point.

Thus, the total storage needed is about 4 MB which easily fits within the 512 MB capacity. The additional storage is used for the feature application, which includes the LCD graphics.

eMMC 120 is a flash memory similar to that manufactured by Micron, model number MTFC4GMDEA-1MWT and has a capacity of 4 GB in order to support running the operating system and tire code reader application 100. An eMMC driver 124 and file system driver 126, which operate through a secure digital input/output SDIO driver, are provided by kernel 104.

Figure 10:
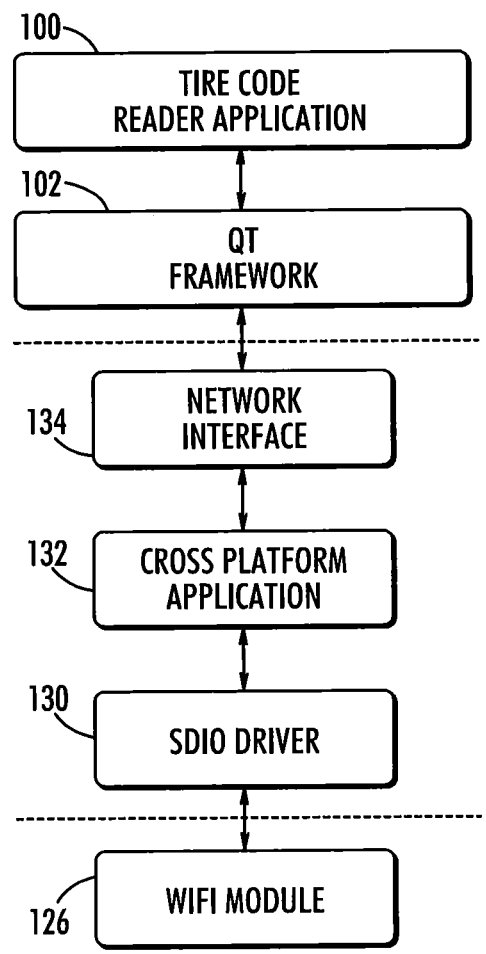
FIG. 10 is a wireless communication block diagram for the tire code reader application, according to an aspect of the disclosure.

As shown in FIG. 10, tire code reader 20 includes a Wi-Fi module 126 to communicate with control server 80. Wi-Fi module 126 may be similar to that manufactured by Atmel, model number ATWILC1000. Wi-Fi module 126 supports the IEEE 802.11 b/g/n protocols and WEP, WPA, and WPA2 security. It operates using a single spatial stream (single antenna) in the 2.4 GHz ISM band.

Application processor 72 uses a SDIO driver 130 to communicate with Wi-Fi module 126. Alternatively, kernel 104 may be selected to be similar to that provided by Atmel which has built-in support for Wi-Fi module 126. Tire code reader application 100 controls the connection of Wi-Fi module 126 using a standard network interface 134 that enables communication using the sockets provided by a cross-platform application 132, such as MAC 803-11.

Figure 11:
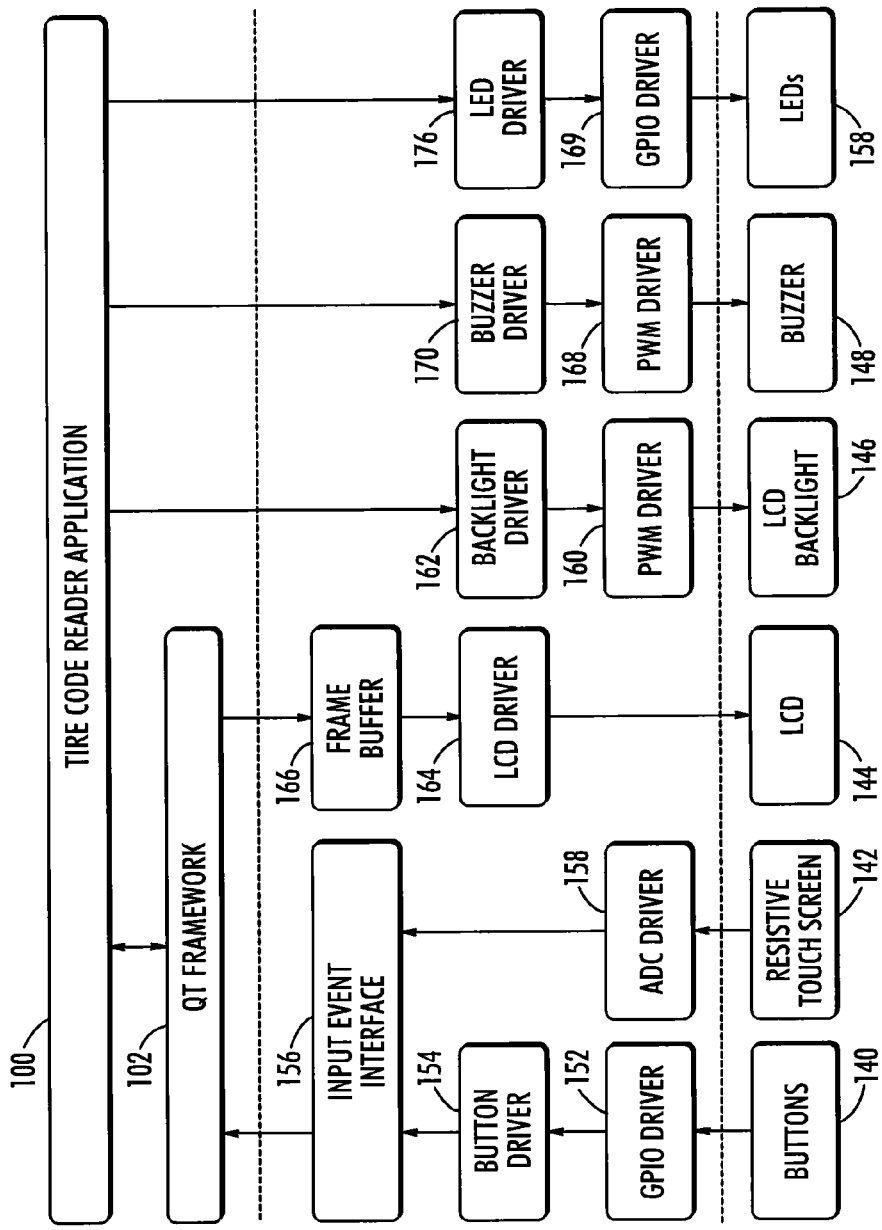
FIG. 11 is a user interface block diagram for the tire code reader application, according to an aspect of the disclosure.

FIG. 11 is a block diagram for the software for the user interface of tire code reader 20. The hardware for the user interface includes two physical buttons 140, resistive touch screen 142, LCD 144, LCD backlight 146, buzzer 148, and LEDs 150. Buttons 140 include ON/OFF button 32 to power the device on and off and trigger button 34 that initiates the VIN and tire code scans. ON/OFF button 32 may also be held down to force an immediate shutdown of tire code reader 20. Both buttons 32, 34, connect via a GPIO driver 152 and are de-bounced by a button driver 154. Button events of "press" and "release" are signaled to tire code reader application 100 through an input event interface 156.

Resistive touch screen 142 enables the user to interact directly with images and virtual buttons 140 on display 26. Touch screen 142 may be a 4-wire interface that is monitored directly by an ADC driver 158 and events signaled through input event interface 156 to application processor 72.

LCD 144 is the key component of display 26. LCD 144 may be one similar to that manufactured by Ortustech Blanview, model number COM43H4M10XTC, that it, it has a 4.3-inch, 24-bit color TFT-LCD with a resolution of 1440×272. It can be controlled directly using a parallel red-green-blue (RGB) additive color LCD driver 164 off a frame buffer 166. The intensity of the LCD backlight 146 is controlled using a pulse-width modulation (PWM) signal from a PWM driver 160 instigated by a backlight driver 162. Backlight 146 consumes a significant amount of power, so it will be turned off whenever possible.

Buzzer 148 alerts the user of various conditions, including the completion of a VIN barcode scan. Buzzer 148 is controlled using a pulse-width modulation (PWM) signal from a PWM driver 168 as instigated by buzzer driver 170 that enables different pitch sequences to be played.

LEDs 150 provide visual feedback to the operator when LCD feedback is not suitable. LEDs are controlled via GPIO driver 169 by an LED driver 176.

Figure 12:
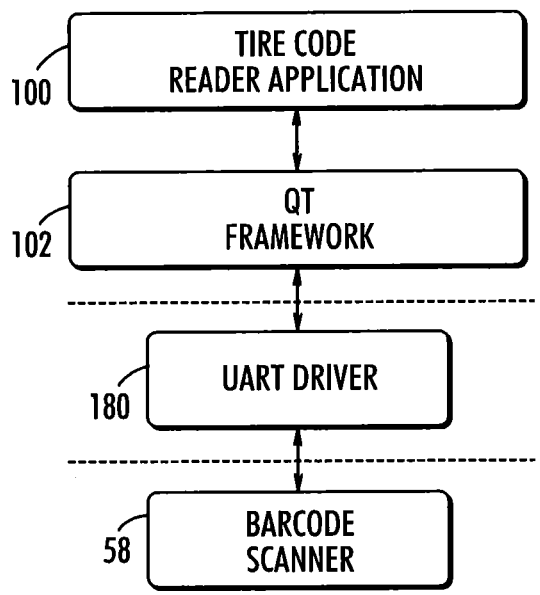
FIG. 12 is a barcode scanner block diagram for the tire code reader application, according to an aspect of the disclosure.

As shown in FIG. 12, barcode scanner 58 allows the operator to scan a VIN barcode located in the door jamb of a vehicle. Tire code reader application 100 communicates with barcode scanner 58 via a Universal Asynchronous Receiver Transmitter (UART) interface 180. UART interface 180 may operate at a baud rate of 9,600.

Figure 13:
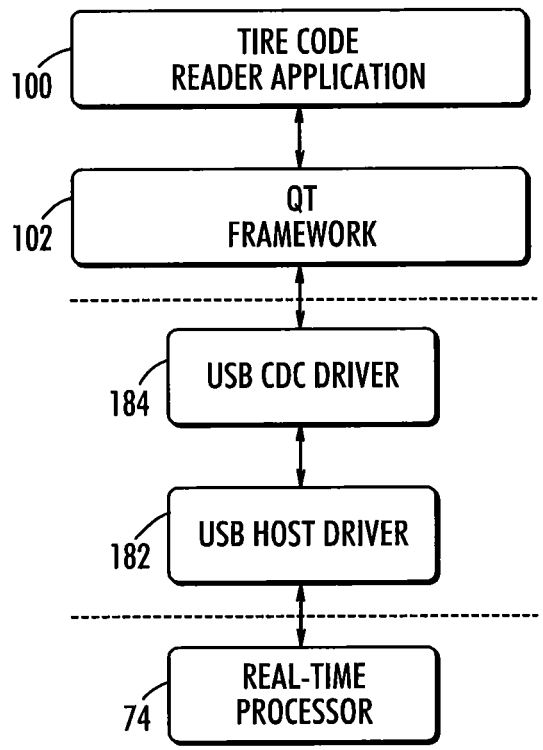
FIG. 13 is an inter-processor communication block diagram for the tire code reader application, according to an aspect of the disclosure.

FIG. 13 illustrates communication between tire code reader application 100 and real-time processor 74 interface via USB host driver 182 and a USB CDC driver 184. Real-time processor 74 sends and receives laser control and data messages over this serial interface and is thus acting as a device. Full-speed USB operates at a speed of up to 12 Mbps, but actual throughput is slightly less. Throughput is adequate for transferring laser scan data, as the maximum data rate of the laser interface is 3 Mbps and passes through a full-duplex RS-485 transceiver 68. USB delivers data packets by using automatic low-level retries.

In reducing power consumption, application processor 72 may suspend USB. The suspension command is sent by application processor 72 to real-time processor 74 to shut down laser 46 and motor 42 via its control hardware and to enter a low power mode.

Figure 14:
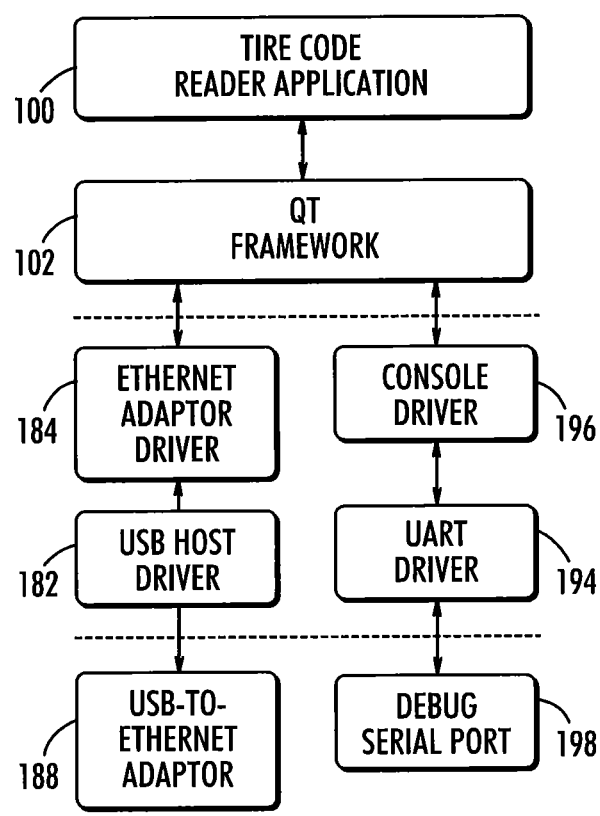
FIG. 14 is a development block diagram for the tire code reader application, according to an aspect of the disclosure.

As shown in FIG. 14, tire code reader application 100 communicates with a USB-to-Ethernet adapter 188. USB-to-Ethernet adaptor 188 is driven by a USB host driver A and B 190, 190' and an Ethernet adaptor driver 192 to provide a hard-wired networking interface. This interface will allow tire code reader 20 to be booted from a network file system in support of software development. A serial debug port 198 for debugging is provided via another Universal Asynchronous Receiver Transmitter (UART) interface 194 and a console driver 196.

Figure 15:
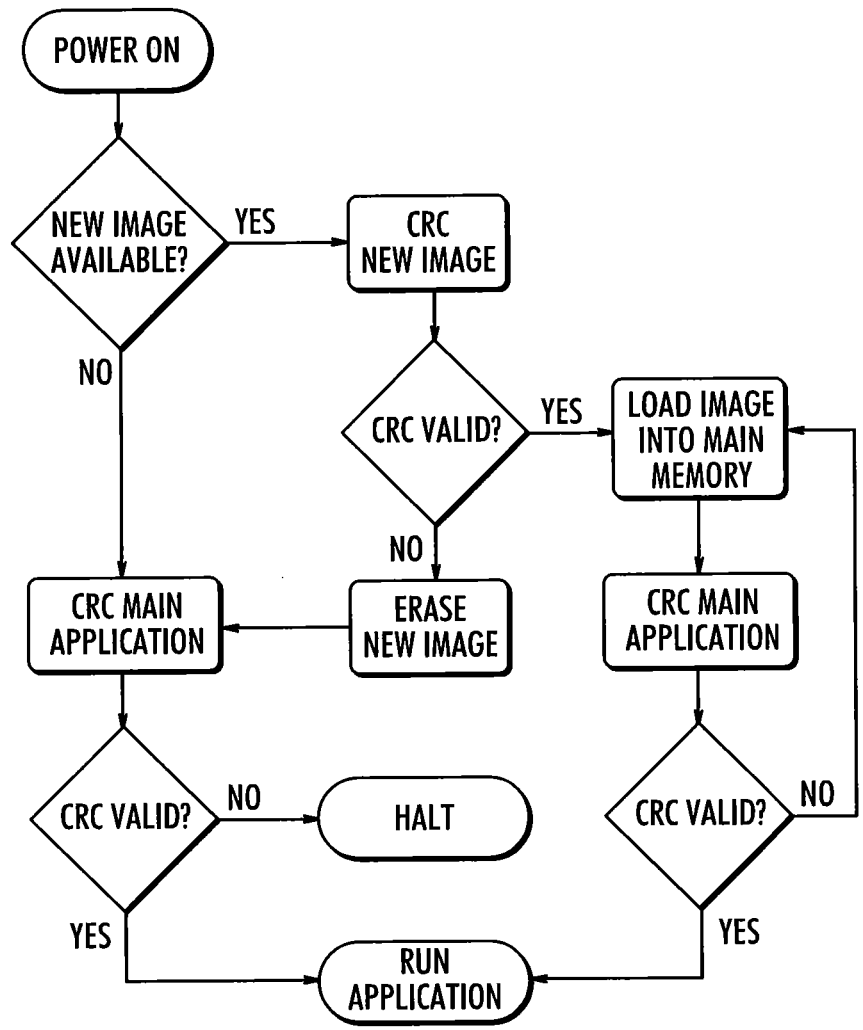
FIG. 15 illustrates the real-time processor boot sequence for the tire code reader application, according to an aspect of the disclosure.
Figure 16:
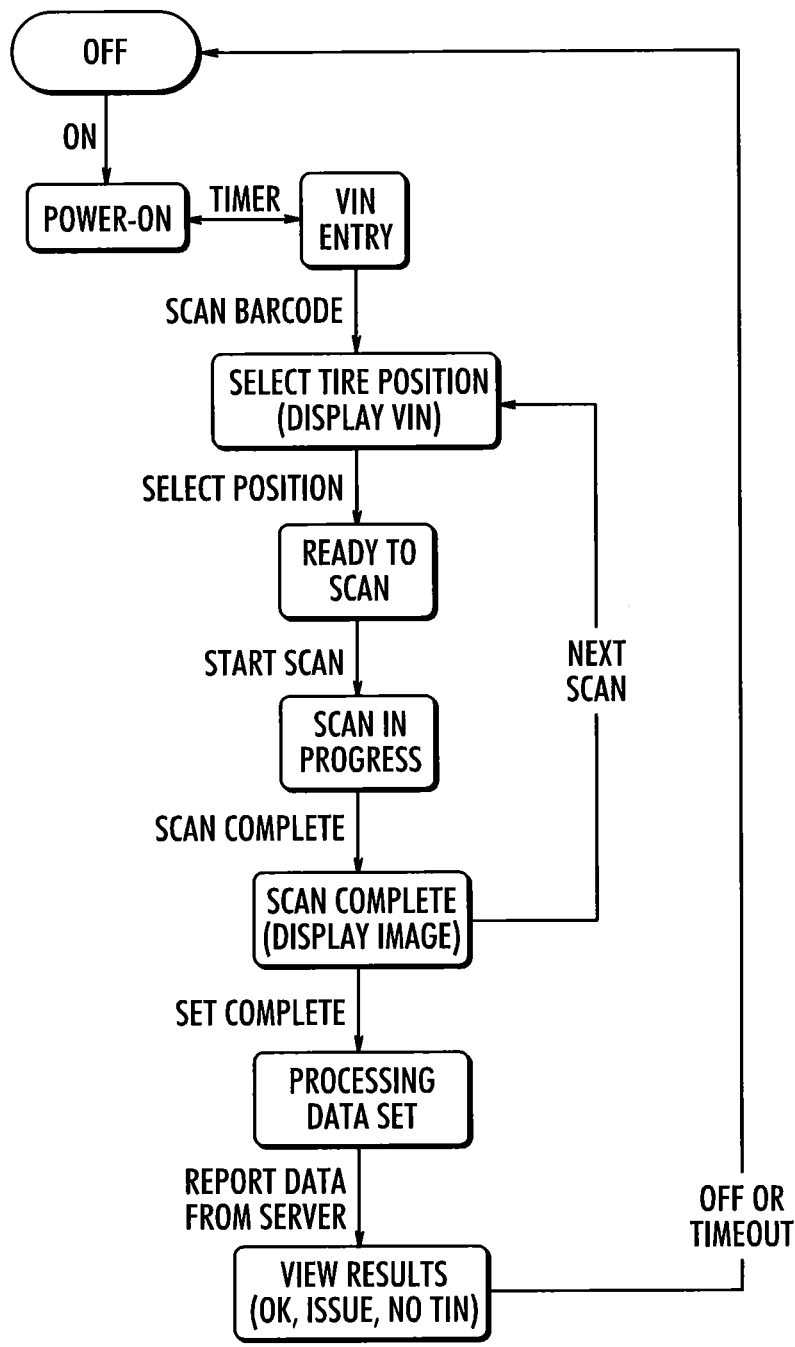
FIG. 16 is a workflow diagram for the tire code reader application, according to an aspect of the disclosure.

Real-time processor 74 contains a custom bootloader, which is a small program shown in FIG. 15 that is responsible for verifying and starting the real-time application and for checking for a new firmware image. After powering on, the bootloader checks a dedicated location of flash memory that is reserved for staging a new firmware image. If the new firmware image is present in the dedicated location, the bootloader verifies the image using a cyclic redundancy check (CRC), and loads the validated image into the main program memory, and starts the main application, namely, scanning. If no new firmware image is present or the image loaded is not CRC valid, the bootloader proceeds to check the main application. Any invalid image is erased. If the application passes the CRC, then the application is run FIG. 16 illustrates the basic workflow of tire code reader system. The power, initially turned off, is turned on, which starts an internal timer. "VIN Entry" is selected using touch screen 62. A VIN bar code is presented to tire code reader 20's bar code scanner 58. Then trigger 34 is pulled to activate bar code scanner 58. Next, "Tire Code Scan" is selected from touch screen 62 and a tire is selected, also using touch screen 62, such as RF, LF, RR, LR, S for right front, left front, right rear, left rear, and spare, respectively. Each tire code 12 is scanned by placing shroud 28 against tire 10 with tire code 12 centered within shroud 28. Pulling trigger 34 activates tire code scanner 36 and captures an image of the first tire 10. Each tire 10 on the vehicle is identified and scanned in turn, including a spare tire, if any. The VIN number and tire code images are sent to cloud server 70 by control server 80 for processing and the results returned. The abbreviated results are displayed on tire code reader 20; the complete results are sent to control server 80 and then to a printer 90 for printing a paper copy. The results may be "OK," "ISSUES" if the tire code can't be read, or "No TIN" (tire identification number) if no tire number has been found in the image. If the timer runs out and no VIN scan is performed, tire code reader 20 turns itself off.

As seen in FIG. 17, tire code reader 20 communicates with control server 80 via Wi-Fi according to a Wi-Fi protocol data flow shown in FIG. 17. This Wi-Fi connection allows tire code reader 20 and control server 80 to communicate using transmission control protocol (TCP) sockets. Control server 80 waits for a connection from tire code reader 20. To communicate, tire code reader 20 opens a socket connection to control server 80 and transfers messages. Control server 80 acknowledges receipt of these messages by a reply. Tire code reader 20 then closes the socket connection once all communications are complete.

The messages start with binary type and length fields, followed by extensible markup language (XML) or other command structure, such as Java Script object notation (JSON).

The primary data sent to cloud-based server 70 from tire code reader 20 via control server 80 is the image data message. An image data message may include the following: store ID, reader ID, operator ID, VIN, image ID, tire location, and image.

After querying control server 80, cloud-based server 70 will reply with the results. A reply message may include the following: timestamp, store ID, reader ID, operator ID, VIN, car information (year, make, and model), image ID, tire location, tire code, re-call information. Control server 80 may use WPA2 security to control access. The complete results are sent by control server 80 to printer and the tire code is sent to display 26 on tire code reader 20.

Those skilled in the art of tire maintenance and service will appreciate many modifications and substitutions may be made to the foregoing description of features of the present invention without departing from the spirit and scope of the appended claims.

What is claimed is:

1. A tire code reader system, comprising:
a tire code reader including
a housing including a handle,
a scanner carried within said housing, said scanner measuring distance from said scanner to a tire sidewall when said scanner is placed against a tire sidewall where a tire code is present and to produce a two-dimensional array of distance measurements from said scanner to said tire sidewall, said two-dimensional array defining an image,
a shroud attached to said scanner, said shroud spacing said scanner a fixed distance from said tire sidewall when said shroud is placed against said tire sidewall,
a display carried by said housing, and
a processor controlling said scanner and said display;
a server in communication with said processor of said tire code reader, said server being programmed to recognize alphanumeric characters in said image, and wherein said server recognizes a tire code from said image and returns said tire code to said processor whereupon said processor displays said tire code on said display.

2. The tire code reader system of claim 1, wherein said server and said processor communicate wirelessly.

3. The tire code reader system of claim 1, wherein said server is a cloud-based server programmed to access and interrogate databases for tire recall information.

4. The tire code reader system of claim 1, further comprising a bar code reader, said bar code reader reading a vehicle identification number coded as a bar code on a vehicle, said processor associating said vehicle identification number with said image of said tire code on a tire on said vehicle, and wherein said server is programmed to access databases of information about vehicles based on vehicle identification number.

5. The tire code reader system of claim 1, further comprising a memory, said memory storing a set of images corresponding to a set of tires of a vehicle.

6. The tire code reader system of claim 1, wherein said handle is pivotable between a first position and a second position, said handle locking in both said first and said second position.

7. The tire code reader system of claim 1, further comprising a printer in communications with said server.

8. The tire code reader system of claim 1, wherein said processor includes a tire code reader number with said image to identify said tire code reader.

9. The tire code reader system of claim 1, wherein said processor includes an application processor and a real-time processor, said application processor controlling said display, and said real time processor controlling said movement of said scanner.

10. The tire code reader system of claim 1, wherein said server is a cloud-based server and wherein said tire code reader system further comprises a control server and a printer, said control server in communication with said processor and with said cloud-based server and with said printer.

11. The tire code reader system of claim 1, wherein said scanner scans said tire sidewall in increments of 0.2 mm.

12. The tire code reader system of claim 1, wherein said display is a touch screen display.

13. A tire code reader system, comprising:
a tire code reader including
a housing including a handle, a scanner carried within said housing, said scanner measuring distance from said scanner to a tire sidewall when said scanner is placed against a tire sidewall where a tire code is present and to produce a two-dimensional array of distance measurements from said scanner to said tire sidewall, said two-dimensional array defining an image, a shroud attached to said scanner, said shroud spacing said scanner a fixed distance from said tire sidewall when said shroud is placed against said tire sidewall, a display carried by said housing, and an application processor controlling said display;

a real-time processor controlling motion of said scanner;

a control server in communication with said real time processor of said tire code reader, and a cloud-based server in communication with said control server, said cloud-based server being programmed to recognize alphanumeric characters in said image, and wherein said cloud-based server recognizes a tire code from said image and returns said tire code to said application processor for display of said tire code on said display.

14. The tire code reader system of claim 13, further comprising a bar code scanner, said bar code scanner reading a vehicle identification number coded as a bar code on a vehicle, said real time processor associating said vehicle identification number with said image of said tire code and communicating said vehicle identification number to said control server, which control server forwards to said cloud-based server, wherein said cloud-based server is programmed to access databases containing information about vehicles based on vehicle identification number and return said information to said control server.

15. The tire code reader system of claim 13, wherein said handle is pivotable between a first position and a second position, said handle locking in both said first and said second position, said second position being 75 degrees from said first position.

16. The tire code reader system of claim 13, wherein said tire code reader system further comprises a printer, and wherein said control server is in communication with said printer.

17. The tire code reader system of claim 13, wherein said real-time processor and said application processor receive power from a battery stored in said handle.

18. The tire code reader system of claim 13, wherein said tire code reader scans said sidewall in increments of 0.2 mm to obtain said two-dimensional array.

19. The tire code reader system of claim 13, wherein said display is a touch screen display.

* * * * *